(No Model.)
A. ROSANDER.
GRAIN DRILL.
No. 502,636. Patented Aug. 1, 1893.
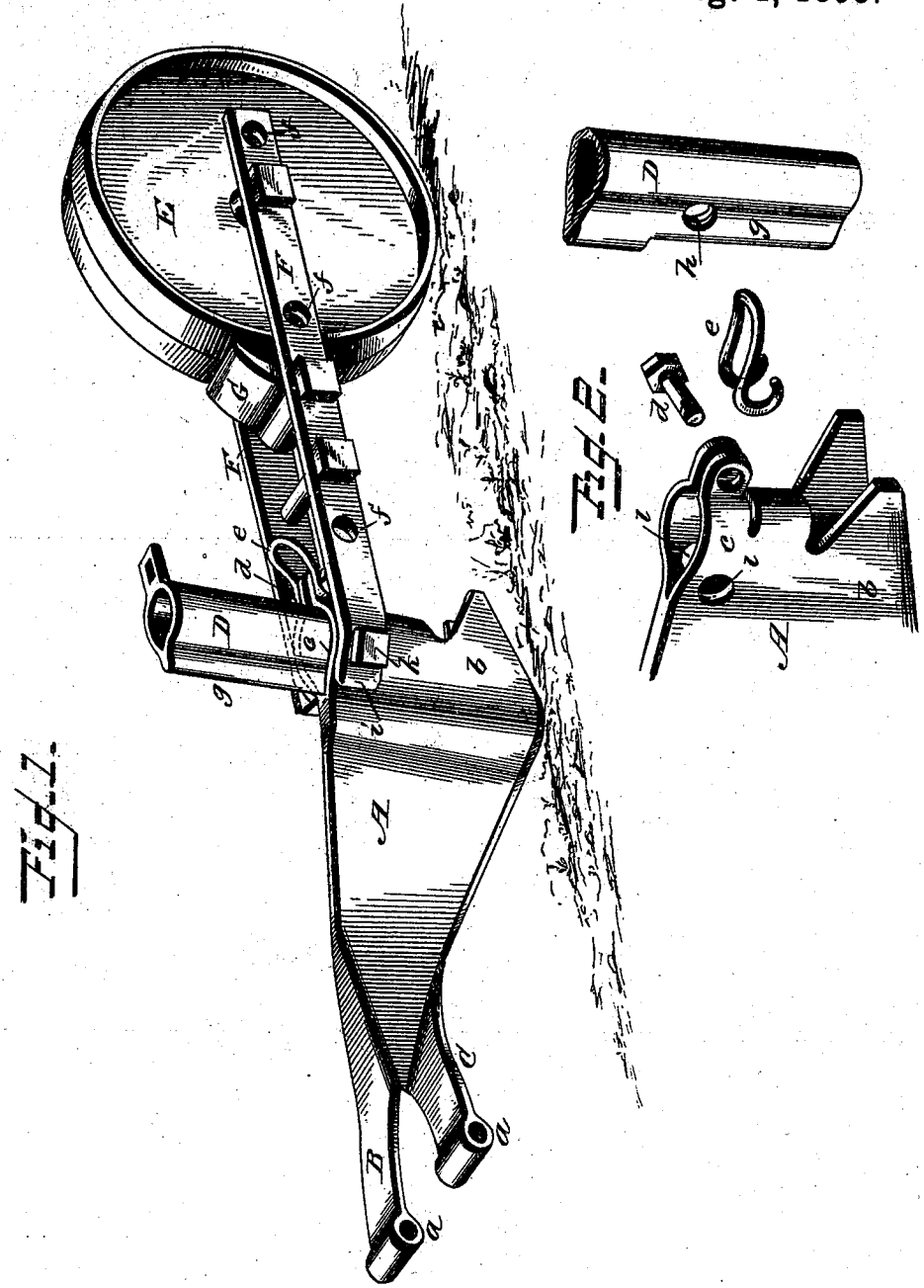
Witnesses
C. J. Williamson
Jas Ellott
Inventor
Andrew Rosander.
per Chas. H. Fowler
Attorney

UNITED STATES PATENT OFFICE.

ANDREW ROSANDER, OF VALE, SOUTH DAKOTA.

GRAIN-DRILL.

SPECIFICATION forming part of Letters Patent No. 502,636, dated August 1, 1893.

Application filed April 3, 1893. Serial No. 469,637. (No model.)

*To all whom it may concern:*

Be it known that I, ANDREW ROSANDER, a citizen of the United States, residing at Vale, in the county of Butte and State of South Dakota, have invented certain new and useful Improvements in Grain-Drills; and I do hereby declare that the following is a full, clear, and exact description of the same, reference being had to the annexed drawings, making a part of this specification, and to the letters of reference marked thereon.

The present invention has for its object to provide a seeding machine or grain-drill that will possess strength and durability and be effective in its operation, and consists in the details of construction substantially as shown in the drawings and hereinafter described and claimed.

Figure 1 of the drawings represents a perspective view of one of the runners and attachments to a grain drill embodying my invention; Fig. 2 a detail view in perspective of the rear end of the runner showing the bolt, clevis, and grain-tube, removed.

In the accompanying drawings A represents the runner having its front end bifurcated to form arms B C which are provided at their extremities with sleeves $a$, the arms with their sleeves being formed in one piece with the body of the runner and provide a very strong and durable means of connecting the runner to the usual transverse beam of the machine in which a plurality of these runners and their attachments are employed. The runner with the arms formed by its bifurcation all in one piece of steel, provides a superior runner in that its stiffness and rigidity are materially increased and consequently its durability enhanced, especially at the front end of the runner. The sleeves $a$ on the arms B C form a wide bearing for the draft rod and render a more firm and secure connection. The heel $b$ of the runner is of such form as to allow the top soil to fall on the seed over the spreading guards.

The grain-tube D is held between the plates $c$ at the rear end of the runner by means of a suitable bolt $d$, or by any other well known fastening, a clevis $e$ being connected to the plates by the same bolt that connects the grain tube to the runner, so as to allow coverers to be used if preferred in place of the wheel E which may be removed.

The bars F connect the wheel E to the runner A and have a plurality of holes $f$ to receive the several bolts which connect the bars together and to the wheel and also hold in place the scraper G between the bars.

The scraper keeps the periphery of the wheel free from the adhering soil and the plurality of holes in the bars enable the position of the wheel with relation to the runner to be changed to increase or diminish the distance between them as would be required by the condition of the soil.

The grain tube D has a longitudinal rib $g$ through which the hole $h$ extends, and the ends of the bars F are bent inward as shown at $i$ to embrace the clamping-plates $c$, and a bolt $k$ passes through a hole $l$ in the plates and through the hole in the rim upon the grain-tube, whereby the tube, runner, and bars are securely connected together but readily separated when required and the tube removed for cleaning or for other purposes.

One of the bolts that connects the bars together may be used for connecting pressure spring and lifting-bars (not shown) and may be engaged with any one of the holes $f$ that will best equalize the pressure on the runner and wheel.

The scraper G is held in position by means of the bars F coming in frictional contact with the edges thereof and can be adjusted to bring the scraper at any desired angle that would give the best results.

The wheel E is formed solid and therefore possesses many advantages over the ordinary spoke-wheel and is considered of material value used in a grain drill or seeder.

The spring clamping plates $c$ form a very simple and effective means for connecting the runner and grain-tube together, also the adjustability of the scraper G to change its angle with relation to the periphery of the coverer-wheel E is of advantage where the condition of the soil varies.

The employment of the parallel bars F to form a connection between the runner and coverer-wheel, aids materially in rendering the drill or seeder simple in construction with increased strength and durability.

The rib $g$ on the grain-tube D not only provides means whereby a bolt can be used for connecting the runner, bars, and tube together, but aids materially to the strength and durability of the tube.

Having now fully described my invention, what I claim as new, and desire to secure by Letters Patent, is—

A grain-drill consisting of a suitable runner formed in one piece with arms at its front end terminating in sleeves, at its rear end spring clamping-plates, a grain-tube removably held between the clamping plates, a suitable wheel or other coverer, and bars connecting the coverer with the runner, substantially as and for the purpose set forth.

In testimony that I claim the above I have hereunto subscribed my name in the presence of two witnesses.

ANDREW ROSANDER.

Witnesses:
   JOHN HODGSON,
   FRANCIS A. GASKILL.